United States Patent
Finkelshtein et al.

(10) Patent No.: US 11,429,790 B2
(45) Date of Patent: Aug. 30, 2022

(54) AUTOMATED DETECTION OF PERSONAL INFORMATION IN FREE TEXT

(71) Applicant: International Business Machines Corporation, Armonk, NY (US)

(72) Inventors: Andrey Finkelshtein, Beer Sheva (IL); Bar Haim, Ashqelon (IL); Eitan Menahem, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 16/581,799

(22) Filed: Sep. 25, 2019

(65) Prior Publication Data

US 2021/0089620 A1 Mar. 25, 2021

(51) Int. Cl.
G06F 40/295 (2020.01)
G10L 15/19 (2013.01)
G06V 30/413 (2022.01)

(52) U.S. Cl.
CPC .......... *G06F 40/295* (2020.01); *G06V 30/413* (2022.01); *G10L 15/19* (2013.01)

(58) Field of Classification Search
None
See application file for complete search history.

(56) References Cited

U.S. PATENT DOCUMENTS

| | | | | |
|---|---|---|---|---|
| 11,120,226 B1* | 9/2021 | Nudd | ...................... | G16H 50/30 |
| 2007/0230787 A1* | 10/2007 | Belitskaya | ........... | G06V 30/268 |
| | | | | 382/182 |
| 2009/0204596 A1* | 8/2009 | Brun | ..................... | G06F 40/295 |
| | | | | 707/999.005 |
| 2012/0101870 A1 | 4/2012 | Gates et al. | | |
| 2015/0026465 A1 | 1/2015 | Cucinotta et al. | | |
| 2018/0197088 A1* | 7/2018 | Bonin | .................... | G06N 5/025 |
| 2019/0034808 A1* | 1/2019 | Palanichamy | ......... | G06N 5/022 |
| 2019/0042568 A1 | 2/2019 | Balabine | | |
| 2019/0278777 A1* | 9/2019 | Malik | ................. | G06F 16/9024 |

(Continued)

OTHER PUBLICATIONS

Zheng, Suncong, Feng Wang, Hongyun Bao, Yuexing Hao, Peng Zhou, and Bo Xu. "Joint extraction of entities and relations based on a novel tagging scheme." arXiv preprint arXiv:1706.05075, p. 1-10 (2017). (Year: 2017).*

(Continued)

*Primary Examiner* — Frank D Mills
(74) *Attorney, Agent, or Firm* — Dvir Gassner (57) ABSTRACT

Automated detection of personal information in free text, which includes: automatically applying a named-entity recognition (NER) algorithm to a digital text document, to detect named entities appearing in the digital text document, wherein the named entities are selected from the group consisting of: at least one person-type entity, and at least one non-person-type entity; automatically detecting at least one relation between the named entities, by applying a parts-of-speech (POS) tagging algorithm and a dependency parsing algorithm to sentences of the digital text document which contain the detected named entities; automatically estimating whether the at least one relation between the named entities is indicative of personal information; and automatically issuing a notification of a result of the estimation.

16 Claims, 4 Drawing Sheets

(56) References Cited

U.S. PATENT DOCUMENTS

2021/0065045 A1\* 3/2021 Kummamuru ........... G06N 5/02

OTHER PUBLICATIONS

Lample, Guillaume, Miguel Ballesteros, Sandeep Subramanian, Kazuya Kawakami, and Chris Dyer. "Neural architectures for named entity recognition." arXiv preprint arXiv:1603.01360 (2016). (Year: 2016).\*

AX Garcia et al., "Identifying Sensitive Information in Text Using an Ontological Knowledge Base, Information Extraction, and Logical Inferencing", 2017, osti.gov.

\* cited by examiner

AUTOMATED DETECTION OF PERSONAL INFORMATION IN FREE TEXT

BACKGROUND

The invention relates to the field of automated text analytics.

The recent increase in information privacy regulation worldwide has given rise to various technologies that evaluate digitally-stored information for compliance with such regulation. In addition, the growth in security attacks on sensitive data stores also drives the development of these technologies, so organizations can allocate sources to protection of high-risk databases and storage systems.

Such technologies provide risk assessments tools regarding compliance with GDPR, PCI, HIPAA, CCPA, LGPD, and other regulations by using sophisticated data classification techniques, vulnerability scanning, and risk scoring.

One such tool is the Security Guardium Analyzer by IBM Corporation, designed to help identify regulated data risks by analyzing on-premises and cloud databases to find and present users with prioritized risk information. It includes a classification engine which searches data inside database tables, performs vulnerability scanning, and uncovers current threats.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a method comprising operating at least one hardware processor to: automatically apply a named-entity recognition (NER) algorithm to a digital text document, to detect named entities appearing in the digital text document, wherein the named entities are selected from the group consisting of: at least one person-type entity, and at least one non-person-type entity; automatically detect at least one relation between the named entities, by applying a parts-of-speech (POS) tagging algorithm and a dependency parsing algorithm to sentences of the digital text document which contain the detected named entities; automatically estimate whether the at least one relation between the named entities is indicative of personal information; and automatically issue a notification of a result of the estimation.

Another embodiment relates to a system comprising: (a) at least one hardware processor; and (b) a non-transitory computer-readable storage medium having program code embodied therewith, the program code executable by said at least one hardware processor to: automatically apply a named-entity recognition (NER) algorithm to a digital text document, to detect named entities appearing in the digital text document, wherein the named entities are selected from the group consisting of: at least one person-type entity, and at least one non-person-type entity; automatically detect at least one relation between the named entities, by applying a parts-of-speech (POS) tagging algorithm and a dependency parsing algorithm to sentences of the digital text document which contain the detected named entities; automatically estimate whether the at least one relation between the named entities is indicative of personal information; and automatically issue a notification of a result of the estimation.

A further embodiment relates to a computer program product comprising a non-transitory computer-readable storage medium having program code embodied therewith, the program code executable by at least one hardware processor to: automatically apply a named-entity recognition (NER) algorithm to a digital text document, to detect named entities appearing in the digital text document, wherein the named entities are selected from the group consisting of: at least one person-type entity, and at least one non-person-type entity; automatically detect at least one relation between the named entities, by applying a parts-of-speech (POS) tagging algorithm and a dependency parsing algorithm to sentences of the digital text document which contain the detected named entities; automatically estimate whether the at least one relation between the named entities is indicative of personal information; and automatically issue a notification of a result of the estimation.

In some embodiments, the method further comprises, or the program code is further executable to: replace, in the digital text document, a pronoun that relates to the at least one person-type entity with a noun which is a name of the at least one person-type entity.

In some embodiments, the method further comprises, or the program code is further executable to: automatically pre-process the digital text document prior to the automatic application of the NER algorithm, by at least one of: detecting a main language of the digital text document, such that the NER algorithm is selected to match the main language; removing from the digital text document at least one of: white spaces, and technical characters; and correcting spelling errors in the digital text document.

In some embodiments, the at least one non-person-type entity is selected from the group consisting of: organization, object, location, nationality, time, date, address, geo-political entity, work of art, event, sexual preference, marital status, profession, money, religious group, political group, language, and quantity.

In some embodiments, the method further comprises, or the program code is further executable to: automatically apply a different named-entity recognition (NER) algorithm to the digital text document; and apply one or more predefined rules to resolve one or more conflicts between named entities detected by the NER algorithm and the different NER algorithm.

In some embodiments, the method further comprises, or the program code is further executable to: filter the named entities and to merge at least some of the named entities.

In some embodiments, said automatic detection of the at least one relation between the named entities further comprises: utilizing a result of the applied dependency parsing algorithm to determine a path of dependencies that connects every two named entities in each of the sentences; selecting a textual expression that lies within the path of dependencies; and associating each of the textual expressions with a relation type selected from a predefined set of relation types.

In some embodiments, said automatic estimation comprises calculating a privacy score of the digital text document, or a privacy score of each of the at least one person-type entity, based on: a first set of predefined scores associated with the relation types, wherein each score of the first set indicates a likelihood that the respective relation type is part of personal information; and a second set of predefined scores associated with the named entities, wherein each score of the second set indicates a likelihood that the respective named entity is part of personal information.

In some embodiments, the method further comprises, or the program code is further executable to: automatically detect that the at least one person-type entity comprises at least one partial person name; automatically apply a NER algorithm to a training set which comprises multiple other digital text documents that include full person names, to detect multiple person-type entities and multiple non-person-type entities; automatically detect relations between the multiple person-type entities and the multiple non-person-type entities, by applying a parts-of-speech (POS) tagging algorithm and a dependency parsing algorithm to sentences of the multiple other digital text documents, which sentences each contain at least two named entities out of the multiple person-type entities and the multiple non-person-type entities; automatically generate a training knowledge graph whose nodes comprise those of the multiple person-type entities and the multiple non-person-type entities which are interrelated, and whose edges comprise respective ones of the relations; automatically generate a specific knowledge graph whose nodes comprise those of the least one person-type entity and of the at least one non-person-type entity which are interrelated, and whose edges comprise respective ones of the at least one relation; and automatically determining at least one full person name of the at least one person-type entity by cross-referencing the specific knowledge graph with the training knowledge graph.

In some embodiments, said cross-referencing is based on at least one of: a graph matching technique, and a Boolean satisfiability problem (SAT) representation and solution technique.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Automated detection of personal information in free text is disclosed herein. The detection harnesses a specific configuration of natural language processing (NLP) techniques, and optionally also graph theory techniques, to detect the existence of personal information about real persons in the text.

First, a named-entity recognition (NER) algorithm may be applied to a digital text document which is suspected to be inclusive of personal information, to detect named entities appearing in the document. These named entities may include person-type entities (i.e., partial or full names of real persons) as well as entities of other types, such as organizations, locations, or nationalities, to name a few examples. Additional examples are given further below.

Next, relations between the named entities are detected, such as relations between a pair of person-type entities or between a person-type entity and a non-person type entity. This may be performed by applying a parts-of-speech (POS) tagging algorithm and a dependency parsing algorithm to sentences of the document which contain the previously-detected named entities. This step produces POS tags for words in these sentences, and syntactic dependencies between the words. Based on these products, a path of dependencies that connects every two named entities in each sentence may be determined, and a textual expression that lies within that path is selected. That expression serves as a descriptor of the relation type between every two entities.

Then, an estimation may be performed as to whether any of the relation types between entities (person to person or person to non-person) is indicative of personal information that is associated with the respective person-type entity. For example, when a person to person relation is detected, the relation itself may be regarded as personal information of one or both these persons, or the relation plus the name of person A can be regarded as personal information of person B (e.g., a "married" relation between an "Andrey" and an "Orli" may be considered personal information of each of Andrey and Orli individually, and even the fact each one of them is married, without naming the spouse, can be regarded as personal information of each). Optionally, a score is calculated for the document as a whole and/or for each person-type entity that appears in it, to quantify the probability that the document indeed includes personal information, the amount of personal information detected, and/or the severity of that personal information.

For a document that mentions a person-type entity only implicitly, such as by referring to the respective person just by one of a first name, last name, nickname, acronym, etc., a technique is disclosed to infer the full name of the person-type entity. The technique includes knowledge graph-based training on other documents that include full person names, followed by a comparison of the training output with a knowledge graph of the implicit person-type entity mentions.

The term "personal information" (also "personal data," "personally identifying information" (PII), or "sensitive personal information" (SPI)), as used herein, may refer to any information about a real person, including information (a) that can be used to distinguish or trace a person's identity, such as name, national identification number, social security number, driver's license number, date and place of birth, mother's maiden name, residential address, Internet Protocol (IP) address, email address, telephone number, or biometric records, (b) that is linked or linkable to a person, such as medical, educational, financial, and employment information of that person. The terms "personal information," "personal data," PII, and SPI are legal concepts, not technical ones, and their use and meaning may vary between jurisdictions and regulations. Accordingly, embodiments of the present invention may be conveniently adjusted to detect various types of such information in free text, as desired by a user of the invention. For example, if a user defines that the "personal information" sought after is mentions of food items a person has eaten, then the NER algorithm may be directed to also seek food-type entities, and the detection of relations between named entities may be focused on textual expressions that include stems like "eat," "consum," "digest," or "enjoy," which indicate that the person has eaten a particular item of food.

Figure 1:
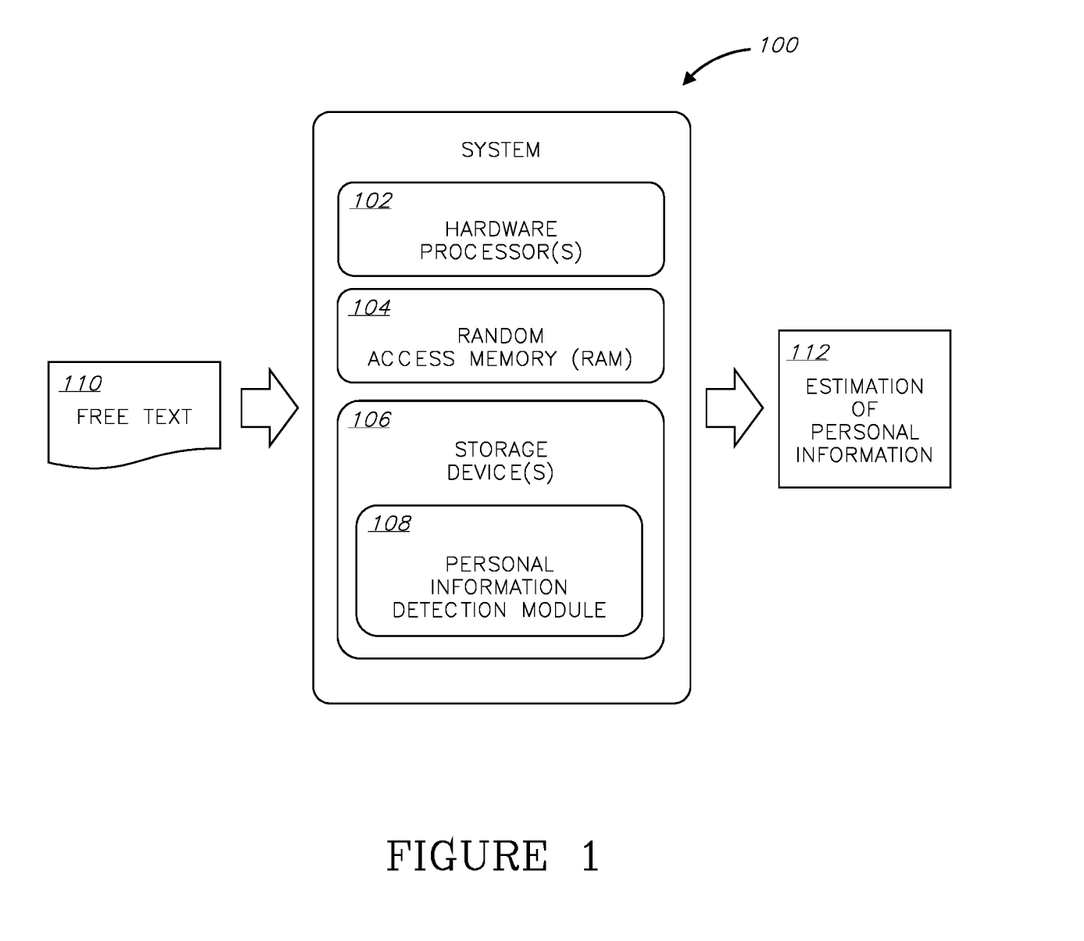
FIG. 1 is a block diagram of a system for automated detection of personal information in free text, according to an embodiment.

Reference is now made to FIG. 1, which shows a block diagram of an exemplary system 100 for detection of personal information in free text, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a personal information detection module 108. The software components may include an operating system having various software components and/or drivers for controlling and managing general system tasks (e.g., memory management, storage device control, power management, etc.), and facilitating communication between various hardware and software components.

System 100 may operate by loading instructions of personal information detection module 108 into RAM 104 as they are being executed by processor(s) 102. The instructions of personal information detection module 108 may cause system 100 to receive free text 110, process it, and output an estimation of personal information 112 included in the text.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, etc. (not shown). Components of system 100 may be co-located or distributed (e.g., in a distributed computing architecture).

The instructions of personal information detection module 108 are now discussed with reference to the flowchart of FIG. 2, which illustrates a method 200 for detection of personal information in free text, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise.

First, free text may be received, for example in the form of a digital text document (hereinafter "document") 202. The term "free text" (also "free-form text"), as known in the art, refers to text written mostly as words and sentences, contrary to "structured" text which is typically only words or multi-word expressions separately stored in database tables or the like.

Document 202 may also include graphics (e.g., images, graphs, illustrations, etc.) but these are optionally ignored in the subsequent steps of method 200. Alternatively, optical character recognition (OCR), as known in the art, may be applied to these graphics, and the recognized text is regarded as part of document 202 for purposes of subsequent steps of method 200.

The receipt of document 202 may be manual, such as by a user who loads the document into system 100 (FIG. 1), or automatic, such as by the system periodically (or upon some other predefined trigger) fetching the document from its storage or from a networked storage resource.

In an optional pre-processing step 204, the text in document 202 may be analyzed and refined, so that the later application of NLP techniques yields more accurate results. Pre-processing step 204 may include one or more of the following actions:

First, detection of the language(s) in which document 202 is written. In case the majority of the text in document 202 is in a first language, but some text (e.g., less than 5% of the total amount text) is in one or more other languages, then the main language of the document may be determined to be the first language for purposes of method 200. The language detection may enable selecting a NER algorithm (to be applied in step 206) that is designed to operate on the pertinent language, as most NER algorithms available today are language-specific.

Second, removal of unnecessary elements such as write spaces (e.g., spaces longer than one unit of inter-character space), and/or technical characters that are not part of the text but rather a product of how the text was saved in a digital file—for example characters that denote a new line (e.g., "\n"), a carriage return (e.g., "\r"), a tabulation (e.g., "\t"), etc.—as known in the art.

Third, correction of spelling and typographical errors in the text, for example using an automatic spell checker.

Fourth, replacement of every pronoun that relates to a person-type entity with a noun which is a name of the person-type entity. Consider, for example, the following text, in which the pronoun "He" is used in the second sentence:

"John went to Jessica's home yesterday. He brought his famous homemade cookies."

In order for the subsequent NLP techniques to analyze this text correctly, "He" may be replaced with "John":

"John went to Jessica's home yesterday. John brought his famous homemade cookies."

The pronoun-noun replacement may be facilitated by applying NER and POS tagging to the text, in order to detect the person-type entities and the grammatical structure of each sentence in the text. In the above example, "He" was replaced with "John" because they are both the subjects of their respective sentences, and it is safe to assume that the author of the text intended "John" when he or she wrote "He." Similar rules for replacing pronouns with nouns will become apparent to those of skill in the art.

Because the pronoun-noun replacement may require use of NER and POS tagging, it is optionally performed not as a stand-alone step but rather following the application of NER and POS tagging to document 202, in steps 206 and 208 described below.

Next, in a step 206, a NER (also known as "entity identification," "entity chunking," or "entity extraction") algorithm may be applied to document 202, to detect named entities (also referred to herein simply as "entities") appearing in it. The NER algorithm, as known in the art, may locate and classify named entity mentions into predefined categories such as person, organization, object, location, nationality, time, date, address, geo-political entity, work of art, event, sexual preference, marital status, profession, money, religious group, political group, language, quantity, etc.

Many of today's NER algorithm are capable of providing classification of named entities with very high granularity, such as determine not only that a certain term is an "object," but also that the object is a "vehicle," "food item," or "electrical appliance," for example. For simplicity of discussion, all entity types which are not "person" are referred to herein as "non-person entities." Each of these non-person entities may constitute personal information in certain contexts. For example, "<Person> works at <Organization>," "<Person> owns <Object>," "<Person> has <Quantity> children," "<Person> supports <Religious Group>," and "I went to visit <Person> at <Location>," may all be considered personal information associated with that person.

The NER algorithm may be one which uses linguistic grammar-based techniques and/or statistical models (e.g., machine learning).

Prominent NER algorithms which may be used for step 206 are those included, for example, in the following software packages: Natural Language Understanding by IBM Corporation; spaCy by ExplosionAI GmbH, Germany; and Natural Language Toolkit (NLTK), online at www.nltk.org and in: Steven Bird, Edward Loper and Ewan Klein (2009), "Natural Language Processing with Python," O'Reilly Media, Inc.

Optionally, multiple different NER algorithms are applied to document 202, in order to enhance the detection of named entities. If there is disagreement between the different NER algorithms regarding the classification of a certain named entity, then a set of predefined rules may be used to decide on the disagreement. For example, if one NER algorithm has classified "Wendy's" as an organization, and another has conflictingly classified it as a person, then a predefined rule may dictate that, on person/organization conflicts, a NER algorithm of a certain type (e.g., a machine learning-based algorithm and not a grammar-based algorithm) is more authoritative. Similar rules may be defined for various types of conflicts, and such rules may take into account the entity types and NER algorithm types involved. Another form of disagreement between different NER algorithms may pertain to a length of a detected named entity; for example, "Neymar da Silva Santos Junior" vs. "Neymar Jr." Again, a rule may be defined so that it either chooses the name produced by a certain type of NER algorithm and not the other, or the lengthier name, for example.

Further optionally, filtering of detected named entities is performed, to remove detection of named entities that do not satisfy some predefined criteria. For example, named entities shorter than X (e.g., three) characters may be removed, or those which include certain non-alphabetic character (e.g., R2-D2 which includes digits; although hyphens may be permitted, as they are common in some person names). Another example is the use of whitelists and/or blacklists of names, which are assembled from available lists of names given to real persons and fictional names, respectively. Such filtering may be required if the NER algorithm used relies only or mostly on text structure, and is therefore not configured to differentiate real person entities from fictional names (such as names of movie characters, mythical characters, etc.). However, many existing NER algorithms are capable of making that differentiation quite reliably.

Yet further optionally, similar named entities may be merged, to treat cases where a certain person (or other type of entity) is mentioned differently in various parts of document 202 purely due to writing style and not because these mentions are different persons. For example, if document 202 intermittently mentions parts of a full name of person, then all these partial mentions may be converted to the person's full name. For instance, if document 202 sporadically mentions "J K Rowling," "Joanne Rowling," "Joanne," "Joanne R.," and "J. K. Rowling," then the merging may include replacing each of these mentions with "Joanne Rowling" or with any one of the mentions whose characteristics have been predefined as more desirable (e.g., length, number of words, etc.). This merging should not be confused with the technique for inferring a full name of a person-type entity, discussed below with reference to FIG. 4. The present merging is applicable to a case where document 202 does mention the full name of the pertinent person at least once, and then mentions him or her by a partial name. The technique of FIG. 4 relates to a case where only implicit, partial mentions of the person are available in a certain document.

As step 206 concludes, it provides an output of the named entities detected, each given as a class and name combination. Optionally, the output also includes a notation of the position of each named entity in each sentence it was found at. For example, the output associated with the sentence "Pavlova always eats Pavlova after her show" may include the following 3-tuples: (Pavlova, person, 1-1) and (Pavlova, food, 4-4), denoting that the person-type entity Pavlova extends between word index locations 1 and 1 of the sentence (namely, it is a single word), and the food-type entity Pavlova extends between locations 4 and 4 of the sentence). It is of course possible to use a different kind of index for the notation, such as a letter-based index. The position notation may also include, if desired, the location of the sentence itself in document 202. If no named entities were detected at all, or if only non-person-type named entities were detected, then method 200 may terminate, because document 202 likely does not include personal information.

In a step 208, relations between the named entities which were output by step 206 may be detected. This may involve applying a POS tagging (sometimes called "grammatical tagging" or "word-category disambiguation") algorithm and a dependency parsing algorithm at least to sentences of document 202 that each contain at least two of the detected named entities. Alternatively, a single algorithm that fulfills both functionalities may be used.

The application of the POS tagging algorithm may tag words in a sentence with their grammatical part-of-speech, such as adjective, adposition, adverb, conjunction, article, noun, particle, pronoun, verb, etc. The POS tagging algorithm may also tag multi-word expressions which jointly form a part-of-speech, such as a compound noun, compound adverb, etc.

The application of the dependency parsing algorithm may detect syntactic dependencies (sometimes referred to as syntactic "relationships") between words of a sentence. Each dependency may be between what is often referred to as a "head" word, and another word which depends on that head and modifies it. Some exemplary relationships that may be detected by common dependency parsing algorithms include "root", "clausal modifier of noun" (often abbreviated "acl"), "clausal complement" (often abbreviated "ccomp"), and many others.

The exemplary software packages mentioned above, namely, Natural Language Understanding, spaCy, and NLTK, include POS tagging and dependency parsing algorithms that may be used in step 208.

To determine the relations between the named entities, the results of the POS tagging and the dependency parsing may be utilized as follows:

Detected syntactic dependencies in each of the sentences may be traversed, to determine a path of dependencies connecting every pair of named entities (such as a pair of person-type named entities, or one person-type entity and one non-person-type entity) in the sentence; namely, the pair of named entities may not be directly connected by a single syntactic dependency but rather by a series of words that have some pair-wise dependencies between them, and overall form an indirect connection between the two named entities.

Then, a textual expression (with one or multiple words) that lies within the path of dependencies may be selected, based on the POS tags of the words in that path. For example, the selected textual expression may have a first word which is a verb or an adjective, and a second word which is not a named entity and is syntactically dependent upon the first word (e.g., an expressions such as "works at"). As another example, the first word in the textual expression "does not work for" is a verb, the second—a negation, and the third and fourth—a prepositional verb. A further example is an expression such as "break out of", which is a phrasal verb detectable by matching against a dictionary of phrases.

Figure 3:
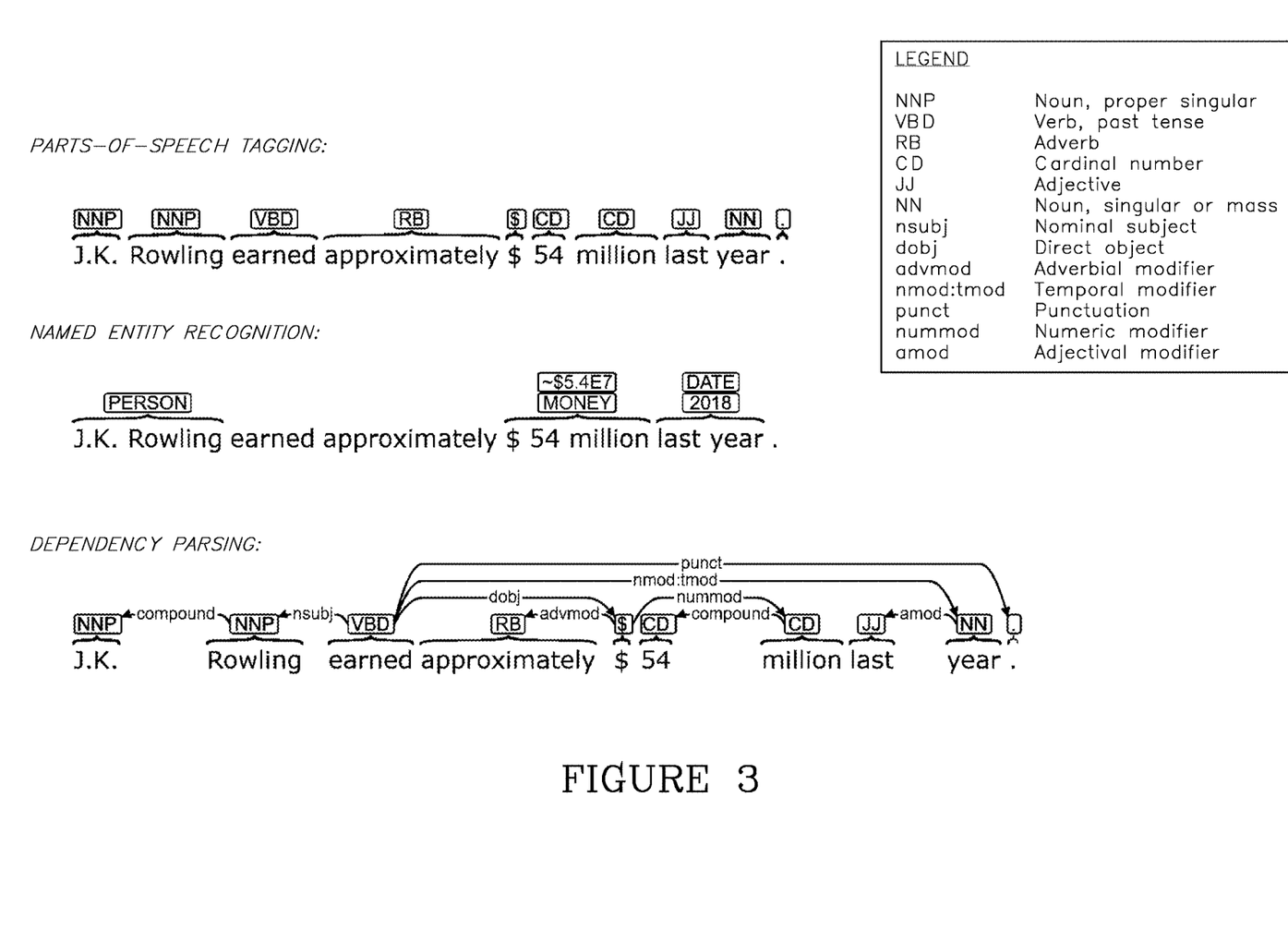
FIG. 3 is an illustration of exemplary NER, POS tagging, and dependency parsing results, according to an embodiment.

For instance, consider the sentence "J. K. Rowling earned approximately $54 million last year," whose NER, POS tagging, and dependency parsing results are illustrated in FIG. 3. The POS tagging algorithms detects the person-type named entity "J. K. Rowling" and the money-type named entity "$54 million." It also detects "last year" as a date-type named entity, but that type is of no interest in this example.

The dependency parsing algorithm confirms that these two entities are indirectly connected by two syntactic dependencies: a direct object (dobj) dependency of "$54 million" upon "earned," and a nominal subject (nsubj) dependency of "earned" upon "J. K. Rowling."

The path between the two named entities of interest is the words "earned approximately." To select a textual expression in this path, it is first determined that "earned" is a verb (VBD), and should thus be the first word in the expression. The word "approximately" is not a recognized named entity and is dependent upon "earned" (indirectly, via "$"), and should thus serve as the second word in the expression. The selected textual expression is therefore "earned approximately." In this example, all the words in the path have been selected as the textual expression, but, in practice, paths may include one or more words which are not selected as part of the expression. For instance, in "earned approximately," the second word could have been ignored, since it does not contribute much to the notion of personal information by disclosing how much a person had earned.

Figure 2:
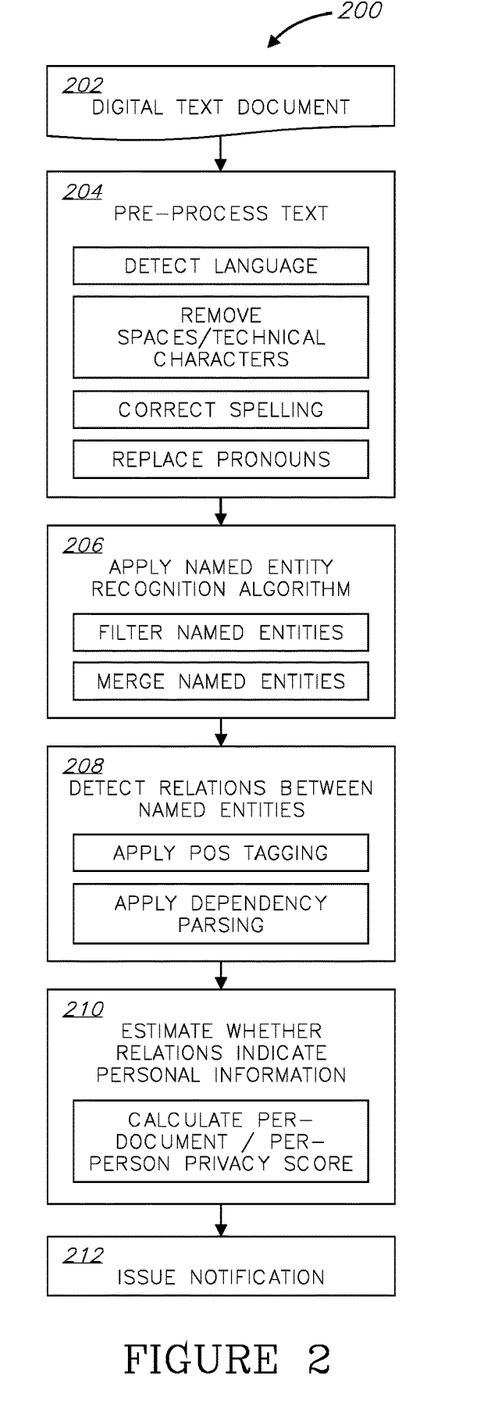
FIG. 2 is a flowchart of a method for automated detection of personal information in free text, according to an embodiment.

Reference is now made back to FIG. 2. When method 200 is applied to many different documents, there could be a very large number of differently-phrased textual expressions. It may therefore be advantageous to define the relations of step 208 by a smaller number of options. Accordingly, a predefined list of relation types may be provided, and the selected textual expressions may be analyzed for similarity with these types, to associate each expression with the most similar type. The similarity analysis may utilize NLP techniques to determine, for example, lexical similarity and/or semantic similarity between textual expressions and predefined relation types, as known in the art.

The predefined relation types may include types which are likely to be associated with personal information, such as relations that imply an association between a person-type named entity and information like a national identification number, social security number, driver's license number, date and place of birth, mother's maiden name, residential address, Internet Protocol (IP) address, email address, telephone number, medical condition, educational background, financial data, employment record, etc. Merely as an example, textual expressions such as "works at,", "serves as a <role> at," "was fired from," may all be associated with a predefined relation type that denotes employment data of a person, such as a relation type of "employed by."

In step 210, it may be estimated whether each relation between a person-type entity and another person-type or non-person-type entity is indicative of some personal information revealed by: the person-type entity and the relation (e.g., "Andrey is married"); or the person-type entity, the relation, and the other entity (e.g., "Andrey is married to Orli," or "Andrey is a computer scientist"). This estimation may be based on one or more factors, such as a set of predefined scores associated with the relation types (determined in step 208) and/or a set of predefined scores associated with the non-person entity types (detected in step 206). Each of these scores indicates the likelihood that the relation type or the non-person entity type, respectively, reveals or is part of personal information. For example, a relation type which indicates that a person has a certain medical condition may receive a relatively high score, whereas a relation type which indicates that a person lives in a certain country may receive a relatively low score. With respect to the non-person entity types, for example, a "disease" type may receive a relatively high score, whereas a "profession" type may receive a relatively low score.

The relation type score and non-person entity type score may be combined into a unified score for each instance in the document where a person entity type, a relation, and a person or non-person entity type appear in a sequence. The combination of the scores may be based on simple addition, multiplication, or on some other logic that amplifies the effect of either the relation type score or the non-person entity type score, per user preference.

In order to calculate a privacy score per each person mentioned in document 202, the unified scores that are associated with the instances of that person-type named entity may be aggregated, such as by simple addition or by some more complex logic, per user preference. A higher privacy score will thus denote an estimation that document 202 includes a large amount of personal information about the respective person, and a lower privacy score will denote the opposite.

It is also possible to calculate a privacy score per document 202 as a whole, indicating the estimated amount of personal information it includes. This may be performed by aggregating the privacy scores that were computed for all the person-type named entities appearing in the document. The aggregation may be by simple addition or by some more complex logic, per user preference.

In a step 212, a notification of a result of the estimation may be issued. This may include, for example, displaying the per-person privacy scores and/or the per-document privacy score on a computer display, transmitting the scores in an electronic message, adding the scores as attributes to document 202 (namely, to the digital file storing the document), recording the scores in a database that stores document and privacy score data, etc. Optionally, based on the notification, document 202 may be transferred, manually or automatically, to a storage location which complies with pertinent regulation. For example, if document 202 was determined (e.g., by a privacy score exceeding a predefined threshold) to include personal information of a person-type entity residing in the European Union (or otherwise subject to European Union regulation, such as GDPR), then the document may be transferred to physical storage within the European Union. The same rationale applies to other jurisdictions and regulations. Conversely, if document 202 was determined to be free of personal information, whether completely or as far as a certain regulation/jurisdiction is concerned, then the document may be transferred to physical storage based on various technical and/or business considerations, without regard to regulation.

Figure 4:
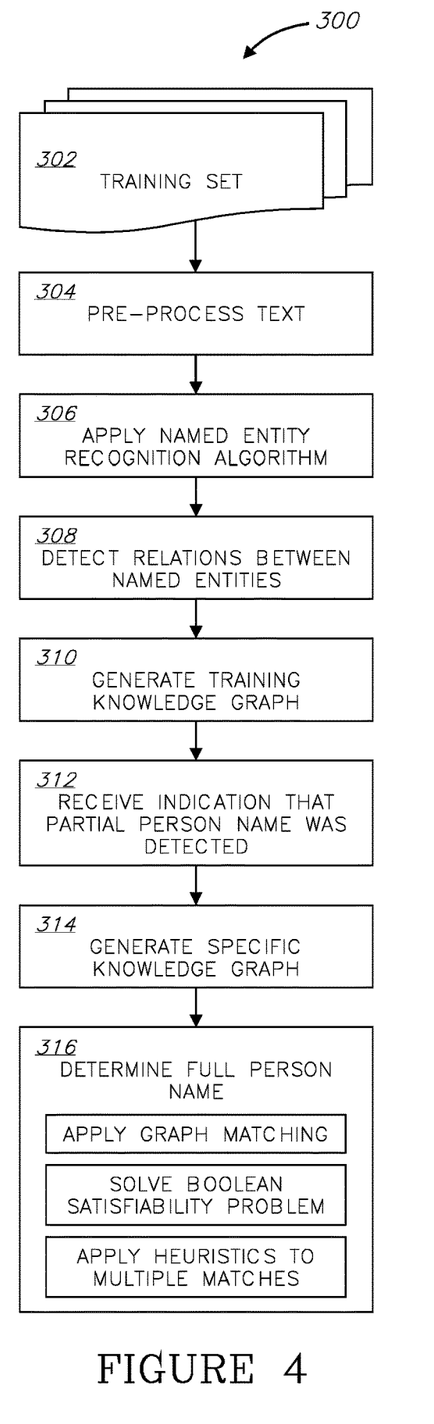
FIG. 4 is a flowchart of a method for inferring a full name of a person-type entity which is mentioned in a digital text document only implicitly, according to an embodiment.

Reference is now made to FIG. 4, which is a flowchart illustrating a method 300 for inferring a full name of a person-type entity which is mentioned in a digital text document only implicitly, in accordance with an embodiment. Alternatively, method 300 may occasionally not be successful in inferring the full name of the implied person-type entity, but may still narrow down the answer to a small enough group of people in which a match can likely be found, perhaps with additional manual labor. Steps of method 300 may be part of the instructions of personal information detection module 108 of FIG. 1.

Steps of method 300 may either be performed in the order they are presented or in a different order (or even in parallel), as long as the order allows for a necessary input to a certain step to be obtained from an output of an earlier step. In addition, the steps of method 300 are performed automatically (e.g., by system 100 of FIG. 1), unless specifically stated otherwise.

Method 300 may be complementary to method 200 of FIG. 2, in that the output of the former (namely, an inferred full name) is used to enhance the output of the latter (namely, personal information estimation with respect to one or more person-type entities) in cases where document 202 mentions a person-type entity only implicitly, such as by referring to it just by one of a first name, last name, nickname, acronym, etc. (hereinafter, by a "partial" person name).

First in method 300, a training set 302 is received, which training set includes multiple digital text documents (hereinafter "documents") that include full person names.

In an optional pre-processing step 304, the texts in training set 302 may be analyzed and refined, so that the later application of NLP techniques yields more accurate results. Step 304 may be similar in essence to step 204 of method 200, except for the fact the various pre-processing actions are applied to multiple documents instead of one. Accordingly, the description of step 204 of method 200 applies here, mutatis mutandis.

In a step 306, a NER algorithm may be applied to training set 302, to detect multiple person-type entities and multiple non-person-type entities. These documents may be documents obtained from the same organization or the same domain to which document 202 of FIG. 2 belongs, such that at least one of these documents (and, even better, a large number of the documents) is likely to refer to the implicit person-type entity by its full name. For example, the documents may be obtained from a data store of a human resources department of an organization, so they are expected to include personal information as to many employees, as well as to mention most or all employees by their full names.

Step 306 may be similar in essence to step 206 of method 200, except for the fact the NER algorithm is applied to multiple documents instead of one. Accordingly, the description of step 206 of method 200 applies here, mutatis mutandis.

As step 306 concludes, it provides an output of multiple person-type entities and multiple non-person type entities, each given as a class and name combination.

In a step 308, relations between person-type entities themselves, or between person-type entities and non-person-type entities (all types of relations jointly referred to as "interrelations") may be detected, by applying a POS tagging algorithm and a dependency parsing algorithm to those sentences of the multiple documents which contain, out of the multiple person-type and non-person-type entities, a pair made up of two person-type entities or a of a person-type entity and a non-person-type entity.

Step 308 may be similar in essence to step 208 of method 200, except for the fact the POS tagging algorithm and the dependency parsing algorithm are applied to a much larger number of sentences, obtained from the multiple documents. Accordingly, the description of step 208 of method 200 applies here, mutatis mutandis.

In a step 310, a training knowledge graph, including nodes and edges, may be generated. The nodes of the training knowledge graph include the multiple person-type entities, as well as those of the multiple non-person-type entities which are related to any of the multiple person-type entities. The edges of the training knowledge graph, in turn, include the respective interrelations of the multiple person-type entities and the multiple non-person-type entities. Accordingly, this training knowledge graph is descriptive of the detected person-type to person-type relations and/or person-type to non-person-type relations appearing in the multiple documents. The generation of the training knowledge graph may utilize any suitable knowledge graph generation software known in the art, which is configured to receive a definition of nodes and edges as input, and output the graph. Notably, the term "graph" does not imply that a graph needs to be graphically rendered; rather, the graph may exist purely as computer code characterizing the graph, such as eXtensible Markup Language (XML) code or code in any other suitable programming or markup language.

The training knowledge graph generated in step 310 may be stored in non-volatile memory for future use, such as for when a partial person name is detected in a document being analyzing by method 200 of FIG. 2.

Accordingly, in a step 312, an indication is received as to a partial person name that was detected. That detection may be made, for example, during or following the execution of step 206 of method 200, when an output of at least one person-type entity is provided. The name of that person-type entity is analyzed, to determine if it is a full name or a partial name, for example by checking the name against a set of rules defining what is considered a full name and/or a partial name. Such rules may dictate, for instance, that a partial name is a name satisfying one or more of the following conditions (and a full name is any name which is not a partial name): it consists only of a single word (e.g., "Jean" or "Picard"); it consists only of two words connected by a hyphen (e.g., "Jean-Luc"); it consists of any of the previous two options, plus one or more single letters (e.g., "J. Picard,", "J. L. Picard") or plus one or more words which are all in capital letters (e.g., "J L Picard"). Other possible rules will become apparent to those of skill in the art. The rules may be realized by regular expressions (RegEx), for example, as known in the art.

In a step 314, a specific knowledge graph may be generated, respective of document 202 of method 200. Nodes of the specific knowledge graph include the at least one person-type entity of step 206 of method 200, as well as those of the at least one (commonly, multiple) non-person-type entity of that step 206 which are related to any of the at least one person-type entity. Additionally or alternatively, nodes of the specific knowledge graph include multiple person-type entities of step 206 of method 200 which are related to each other. Edges of the specific knowledge graph, in turn, include the respective relations between pairs of entities, be it person to person relations or person to non-person relations, which were determined in step 208 of method 200. Accordingly, this specific knowledge graph is descriptive of the detected relations between the at least one person-type entity and either (a) another one of the at least one person-type entity or (b) the at least one non-person-type entity, all appearing in document 202 of method 200.

Statistically speaking, since one or a number of the multiple documents that form the training set are likely to include information as to the at least one person-type entity mentioned in document 202 of method 200, then the information included in document 202 and in the training set can be can be cross-referenced to deduce the full name of the person implied in document 202.

Accordingly, in a step 316, at least one full person name of the at least one person-type entity of document 202 of method 200 is determined, for example by cross-referencing the specific knowledge graph with the training knowledge graph.

Alternatively, if a single full person name of the at least one person-type entity of document 202 of method 200 cannot be determined (for example, because the training set did not include enough conclusory information), then step 316 may determine a group of possible full person names that could be the at least one person-type entity, or a group without full person names but with some other characterization—such as a group of all employees in a particular branch of an organization.

The cross-referencing of step 316 may include, for example, one or more graph matching techniques known in the art. Graph matching techniques typically operate by searching for a sub-graph of a larger graph (in our case, the training knowledge graph) with the highest similarity to a certain smaller graph (here, the specific knowledge graph). An example of a suitable graph matching technique is the one proposed in Cordella, L. P. & Foggia, P & Sansone, Carlo. (2001). An improved algorithm for matching large graphs. 3rd IAPR-TC15 Workshop on Graph-based Representations in Pattern Recognition. 149-159.

Alternatively, the cross-referencing may be represented as a Boolean satisfiability problem ("SAT"). This may be performed by creating separate SAT formulae (also "expressions"), as known in the art, for each person-type entity of the specific knowledge graph. First, a set of a size n, of all the entities that are related to that respective person-type entity in the specific knowledge graph is found. For example, if "Andrey" is the person-type entity and he is related: (a) by a "resides in" relation to an "Israel" location-type entity, (b) by an "employed by" relation to an "IBM" organization-type entity, and (c) by a "married to" relation to an "Orli" person-type entity, then the set of entities is {Israel, IBM, Orli} (n=3).

Next, for every subset (namely, each of the $2^n-1$ possible permutations, without an empty set) of the entities set, a rule is created by placing a logical AND condition between all the entities in that subset. All these rules are then connected with logical OR conditions, to create the SAT formula for the person entity.

Continuing upon the previous example, a SAT formula having the following seven rules will be created:
1. [(X resides in Israel) AND (X employed by IBM) AND (X married to Orli)]
2. OR [(X employed by IBM) AND (X married to Orli)]
3. OR [(X resides in Israel) AND (X married to Orli)]
4. OR [(X resides in Israel) AND (X employed by IBM)]
5. OR (X resides in Israel)
6. OR (X employed by IBM)
7. OR (X married to Orli)

If the multiple documents include a large amount of information on various person-type entities, expressed by many relations between each of these person-type entities and non-person-type entities, then the SAT formula for each person-type entity may become quite lengthy, containing many rules. Accordingly, it may be desired to reduce the number of rules per formula, for example by limiting the size of each possible subset to a certain predefined range. For instance, if the size is limited to between 2 and 5, rules 5-7 in the above example will not be created. Although this means that not all possibilities are explored, the resulting formulae may still be sufficient to reliably associate a partial name from the specific knowledge graph with a full name from the training knowledge graph.

Following the creation of the SAT formulae, the SAT problem may be solved, as known in the art, by evaluating the satisfiability of each formula with various full names from the training knowledge graph. For example, if the training knowledge graph includes the following three full names of person-type entities: "Andrey Finkelshtein," "Eitan Menahem," and "Bar Haim," then the above 7-rule formula will be populated with these three names, and its conditions checked against the training knowledge graph. Even though, per the nodes and edges of the training knowledge graph, all three satisfy the "employed by IBM" and "resides in Israel" conditions, only "Andrey Finkelshtein" satisfies also the "married to Orli" condition. Therefore, "Andrey Finkelshtein" will have accumulated more TRUE rule checks (7) than "Eitan Menahem" and "Bar Haim" (3 each).

Accordingly, the determination that "Andrey Finkelshtein" is the full name of the same person-type entity which appears with just a partial name ("Andrey") in document 202 of method 200 may be based on a voting process in which the person-type entity with the highest number of TRUE rule checks is selected. Alternatively, greater weight may be given to rules with a larger number of conditions, to amplify their effect on the final count of TRUE checks. For instance, each rule may be given a weight which equals its number of conditions. In the above example, rule no. 1 will receive a weight of 3, rules 2-4 a weight of 2 each, and rules 5-7 a weight of 1 each. This will result in 3+2+2+2+1+1+1=12 votes for "Andrey Finkelshtein," and only 2+1+1=4 votes for each of "Eitan Menahem" and "Bar Haim." This does not affect the voting result of the simplistic, 3-entity example given here, but may be useful when the training knowledge graph includes many nodes and numerous edges, and multiple full names may satisfy those rules having a small number of conditions.

Whether the cross-referencing takes the SAT approach or the graph matching approach, it could potentially result in multiple full name matches of person-type entities. To determine which of these matches is likely the correct one, one or more heuristics may be applied: One exemplary heuristic is to apply a string similarity algorithm, as known in the art (e.g., the Levenshtein distance algorithm), to the partial name and to one word (which might be the person's first name or last name) of each of the full names. For instance, assuming that all three full names from the previous example have been equally determined as matches (because all three do happen to be married to an Orli) to a certain partial name "Andre," then the Levenshtein distance algorithm may be applied to "Andre" and to the first word of each of the full name matches: "Andrey" (distance=1), "Eitan" (distance=5) and "Bar" (distance=4). This means that "Andrey" is the best match of the three, and "Andre" is probably a misspelling or Andrey's nickname.

As mentioned above, in some scenarios there may simply not be enough information in the training set to be able to single out one full name which matches the partial name of the person-type entity. Accordingly, if the cross-referencing yields multiple full name matches, then an upper threshold (T) may be applied to these matches, such that than only the T best-matching full names ("best" by the output of the SAT solver or the graph matcher) are output and presented to a user.

To provide an even more meaningful output to the user, the previously-detected relations of multiple full names may be analyzed, and any relation which characterizes all or most of these full names can also be output. For example, all of these full names may share the same relation indicating they are employed specifically in IBM's Haifa research lab. This can be a very useful output, because it means that a certain document includes personal information about a certain IBM Haifa research lab employee, albeit not recognized by his or her full name.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising operating at least one hardware processor to:
   automatically apply a named-entity recognition (NER) algorithm to a digital text document, to detect named entities appearing in the digital text document, wherein the named entities are selected from the group consisting of: at least one person-type entity, and at least one non-person-type entity;
   automatically detect at least one relation between the named entities, by applying a parts-of-speech (POS) tagging algorithm and a dependency parsing algorithm to sentences of the digital text document which contain the detected named entities, wherein said automatic detection of the at least one relation between the named entities further comprises:
      utilizing a result of the applied dependency parsing algorithm to determine a path of dependencies that connects every two named entities in each of the sentences,
      selecting a textual expression that lies within the path of dependencies, and
      associating each of the textual expressions with a relation type selected from a predefined set of relation types;
   automatically estimate whether the at least one relation between the named entities is indicative of personal information, wherein said automatic estimation comprises calculating a privacy score of the digital text document, or a privacy score of each of the at least one person-type entity, based on:
      a first set of predefined score associated with the relation types, wherein each score of the first indicates a likelihood that the respective relation type is part of personal information, and
      a second set of predefined scores associated with the named entities, wherein each score of the second set indicates a likelihood that the respective named entity is part of personal information;
   automatically issue a notification of a result of the estimation; and
   based on the notification, automatically perform at least one of:
      store the digital text document if the privacy score exceeds a predefined threshold,
      add the privacy score as an attribute to a digital file storing the digital text document, and
      transfer the digital text document to a different storage location if the privacy score exceeds a predefined threshold.

2. The method according to claim 1, further comprising operating the at least one hardware processor to replace, in the digital text document, a pronoun that relates to the at least one person-type entity with a noun which is a name of the at least one person-type entity.

3. The method according to claim 1, further comprising operating the at least one hardware processor to:
   automatically pre-process the digital text document prior to the automatic application of the NER algorithm, by at least one of:
      (a) detecting a main language of the digital text document, such that the NER algorithm is selected to match the main language;
      (b) removing from the digital text document at least one of: white spaces, and technical characters; and
      (c) correcting spelling errors in the digital text document.

4. The method according to claim 1, wherein the at least one non-person-type entity is selected from the group consisting of: organization, object, location, nationality, time, date, address, geo-political entity, work of art, event, sexual preference, marital status, profession, money, religious group, political group, language, and quantity.

5. The method according to claim 1, further comprising operating the at least one hardware processor to:
   automatically apply a different named-entity recognition (NER) algorithm to the digital text document; and
   apply one or more predefined rules to resolve one or more conflicts between named entities detected by the NER algorithm and the different NER algorithm.

6. The method according to claim 1, further comprising operating the at least one hardware processor to filter the named entities and to merge at least some of the named entities.

7. The method according to claim 1, further comprising operating the at least one hardware processor to:
   automatically detect that the at least one person-type entity comprises at least one partial person name;
   automatically apply a NER algorithm to a training set which comprises multiple other digital text documents that include full person names, to detect multiple person-type entities and multiple non-person-type entities;
   automatically detect relations between the multiple person-type entities and the multiple non-person-type entities, by applying a parts-of-speech (POS) tagging algorithm and a dependency parsing algorithm to sentences of the multiple other digital text documents, which sentences each contain at least two named entities out of the multiple person-type entities and the multiple non-person-type entities;

automatically generate a training knowledge graph whose nodes comprise those of the multiple person-type entities and the multiple non-person-type entities which are interrelated, and whose edges comprise respective ones of the relations;

automatically generate a specific knowledge graph whose nodes comprise those of the least one person-type entity and of the at least one non-person-type entity which are interrelated, and whose edges comprise respective ones of the at least one relation; and automatically determining at least one full person name of the at least one person-type entity by cross-referencing the specific knowledge graph with the training knowledge graph.

8. The method according to claim 7, wherein said cross-referencing is based on at least one of: a graph matching technique, and a Boolean satisfiability problem (SAT) representation and solution technique.

9. A system comprising:
(a) at least one hardware processor; and
(b) a non-transitory computer-readable storage medium having program code embodied therewith, the program code executable by said at least one hardware processor to:
automatically apply a named-entity recognition (NER) algorithm to a digital text document, to detect named entities appearing in the digital text document, wherein the named entities are selected from the group consisting of: at least one person-type entity, and at least one non-person-type entity,
automatically detect at least one relation between the named entities, by applying a parts-of-speech (POS) tagging algorithm and a dependency parsing algorithm to sentences of the digital text document which contain the detected named entities, wherein said automatic detection of the at least one relation between the named entities further comprises:
utilizing a result of the applied dependency parsing algorithm to determine a path of dependencies that connects every two named entities in each of the sentences,
selecting a textual expression that lies within the path of dependencies, and
associating each of the textual expressions with a relation type selected from a predefined set of relation types;
automatically estimate whether the at least one relation between the named entities is indicative of personal information, wherein said automatic estimation comprises calculating a privacy score of the digital text document, or a privacy score of each of the at least one person-type entity, based on:
a first set of predefined score associated with the relation types, wherein each score of the first indicates a likelihood that the respective relation type is part of personal information, and
a second set of predefined scores associated with the named entities, wherein each score of the second set indicates a likelihood that the respective named entity is part of personal information;
automatically issue a notification of a result of the estimation; and
based on the notification, automatically perform at least one of:
store the digital text document if the privacy score exceeds a predefined threshold,
add the privacy score as an attribute to a digital file storing the digital text document, and
transfer the digital text document to a different storage location if the privacy score exceeds a predefined threshold.

10. The system according to claim 9, wherein the program code is further executable by said at least one hardware processor to replace, in the digital text document, a pronoun that relates to the at least one person-type entity with a noun which is a name of the at least one person-type entity.

11. The system according to claim 9, wherein the program code is further executable by said at least one hardware processor to:
automatically pre-process the digital text document prior to the automatic application of the NER algorithm, by at least one of:
(a) detecting a main language of the digital text document, such that the NER algorithm is selected to match the main language;
(b) removing from the digital text document at least one of: white spaces, and technical characters; and
(c) correcting spelling errors in the digital text document.

12. The system according to claim 9, wherein the at least one non-person-type entity is selected from the group consisting of: organization, object, location, nationality, time, date, address, geo-political entity, work of art, event, sexual preference, marital status, profession, money, religious group, political group, language, and quantity.

13. The system according to claim 9, wherein the program code is further executable by said at least one hardware processor to:
automatically apply a different named-entity recognition (NER) algorithm to the digital text document; and
apply one or more predefined rules to resolve one or more conflicts between named entities detected by the NER algorithm and the different NER algorithm.

14. The system according to claim 9, wherein the program code is further executable by said at least one hardware processor to filter the named entities and to merge at least some of the named entities.

15. The system according to claim 9, wherein the program code is further executable by said at least one hardware processor to:
automatically detect that the at least one person-type entity comprises at least one partial person name;
automatically apply a NER algorithm to a training set which comprises multiple other digital text documents that include full person names, to detect multiple person-type entities and multiple non-person-type entities;
automatically detect relations between the multiple person-type entities and the multiple non-person-type entities, by applying a parts-of-speech (POS) tagging algorithm and a dependency parsing algorithm to sentences of the multiple other digital text documents, which sentences each contain at least two named entities out of the multiple person-type entities and the multiple non-person-type entities;
automatically generate a training knowledge graph whose nodes comprise those of the multiple person-type entities and the multiple non-person-type entities which are interrelated, and whose edges comprise respective ones of the relations;
automatically generate a specific knowledge graph whose nodes comprise those of the least one person-type entity and of the at least one non-person-type entity which are interrelated, and whose edges comprise respective ones of the at least one relation; and automatically determining at least one full person name of the at least one person-type entity by cross-referencing the specific knowledge graph with the training knowledge graph.

16. The system according to claim 15, wherein said cross-referencing is based on at least one of: a graph matching technique, and a Boolean satisfiability problem (SAT) representation and solution technique.

* * * * *